(12) United States Patent
Ranta-Aho et al.

(10) Patent No.: US 8,699,447 B2
(45) Date of Patent: Apr. 15, 2014

(54) METHODS, APPARATUSES, AND COMPUTER PROGRAM PRODUCTS FOR PRIORITIZING UPLINK CARRIERS

(75) Inventors: Karri M. Ranta-Aho, Espoo (FI); Sami-Jukka Hakola, Kempele (FI); Thomas M. Chapman, Stockholm (SE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/203,057

(22) PCT Filed: Feb. 8, 2010

(86) PCT No.: PCT/EP2010/051471
§ 371 (c)(1),
(2), (4) Date: Jan. 4, 2012

(87) PCT Pub. No.: WO2010/097281
PCT Pub. Date: Sep. 2, 2010

(65) Prior Publication Data
US 2012/0093011 A1   Apr. 19, 2012

Related U.S. Application Data

(60) Provisional application No. 61/156,019, filed on Feb. 27, 2009.

(51) Int. Cl.
*H04L 12/26* (2006.01)
(52) U.S. Cl.
USPC .......................................................... 370/330
(58) Field of Classification Search
None
See application file for complete search history.

(56) References Cited

U.S. PATENT DOCUMENTS

| | | | |
|---|---|---|---|
| 6,405,021 B1* | 6/2002 | Hamabe | 455/69 |
| 8,412,103 B2* | 4/2013 | Srinivasan et al. | 455/63.1 |
| 2005/0135312 A1 | 6/2005 | Montojo et al. | 370/335 |
| 2006/0025079 A1* | 2/2006 | Sutskover et al. | 455/67.11 |
| 2008/0102836 A1* | 5/2008 | Wang et al. | 455/436 |
| 2009/0247180 A1* | 10/2009 | Higuchi et al. | 455/452.2 |

FOREIGN PATENT DOCUMENTS

| | | |
|---|---|---|
| CN | 1998247 A | 7/2007 |
| EP | 1 793 509 A1 | 6/2007 |
| WO | WO 2009/003330 A1 | 1/2009 |
| WO | WO 2009/152835 A1 | 12/2009 |

OTHER PUBLICATIONS

IEEE Std 802.11-2007 (Revision of IEEE Std 802.11-1999); IEEE Standard for Information technology—Telecommunications and information exchange between systems—Local and metropolitan area networks—Specific requirements Part 11: Wireless LAN Medium Access Control (MAC) and Physical Layer (PHY) Specifications; IEEE Computer Society, Sponsored by the LAN/MAN Standards Committee; (Jun. 12, 2007), (1232 pages).

* cited by examiner

*Primary Examiner* — Raj Jain
(74) *Attorney, Agent, or Firm* — Harrington & Smith

(57) ABSTRACT

A method, apparatus, and computer program product are provided for prioritizing uplink carriers. A method may include determining a first pilot channel transmission power level for a first uplink carrier. The method may further include determining a second pilot channel transmission power level for a second uplink carrier. The method may additionally include prioritizing the first and second uplink carriers based at least in part upon the first and second pilot channel transmission power levels. Corresponding computer program products and apparatuses are also provided.

13 Claims, 7 Drawing Sheets

METHODS, APPARATUSES, AND COMPUTER PROGRAM PRODUCTS FOR PRIORITIZING UPLINK CARRIERS

TECHNOLOGICAL FIELD

Embodiments of the present invention relate generally to communication technology and, more particularly, relate to methods, apparatuses, and computer program products for prioritizing uplink carriers.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks.

Some evolving wireless and mobile networking technologies, such as of the universal mobile telecommunications system (UMTS) terrestrial radio access network (UTRAN), provide for the assignment of dual uplink carriers to mobile terminal devices, such as a user equipment (UE) device, which may utilize two uplink carriers provided that the mobile terminal is dual carrier capable. However, use of dual uplink carriers by a mobile terminal may presently prove problematic.

In this regard, a mobile terminal may be power limited and have to share its transmission power among both uplink carriers if it transmits on both carriers simultaneously. Thus, when a power limited mobile terminal approaches its total maximum transmission power, the mobile terminal may need to take some action to reduce the transmission power of at least one of the carriers. Otherwise, the mobile terminal may face a loss of one or both uplink carriers due to exceeding the total transmission power capability of the mobile terminal. Based upon current networking standards, mobile terminals may not be configured to intelligently determine what action to take to reduce transmission power consumption when operating two uplink carriers with total transmission power for the two uplink carriers approaching or reaching the total maximum transmission power of a respective mobile terminal. Further, allocation of data rates to an uplink carrier, such as through Transport Format Combination (TFC) and/or Enhanced Transport Format Combination (E-TFC) selection, by a mobile terminal may be complicated through the use of dual uplink carriers by the mobile terminal.

Accordingly, it may be advantageous to provide methods, apparatuses, and computer program products for prioritizing uplink carriers in computing devices such that computing devices may intelligently implement power scaling and/or allocate data rates to an uplink carrier in dual uplink carrier scenarios.

BRIEF SUMMARY OF SOME EXAMPLES OF THE INVENTION

A method, apparatus, and computer program product are therefore provided for facilitating synchronization of setting configurations. In this regard, a method, apparatus, and computer program product are provided that may provide several advantages to computing devices, computing device users, and network service providers. Embodiments of the invention facilitate intelligent implementation of power scaling and/or data rate allocation to an uplink carrier when a computing device is implementing multiple uplink carriers through prioritization of the uplink carriers. At least some embodiments of the invention provide systems, methods, computer program products, and apparatuses enabling a computing device to handle situations in multi-carrier transmission when the computing device starts to run short of transmission power. Embodiments of the invention provide for prioritization of uplink carriers and enable power scaling of lower priority uplink carriers so as to preserve quality of service and also reduce interference at a network entity, such as a base station.

In a first exemplary embodiment, a method is provided, which includes determining a first pilot channel transmission power level for a first uplink carrier. The method of this embodiment further includes determining a second pilot channel transmission power level for a second uplink carrier. The method of this embodiment additionally includes prioritizing, with a carrier management unit, the first and second uplink carriers based at least in part upon the first and second pilot channel transmission power levels.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is configured for determining a first pilot channel transmission power level for a first uplink carrier. The second program instruction of this embodiment is configured for determining a second pilot channel transmission power level for a second uplink carrier. The third program instruction of this embodiment is configured for prioritizing the first and second uplink carriers based at least in part upon the first and second pilot channel transmission power levels.

In another exemplary embodiment, an apparatus is provided. The apparatus of this embodiment includes a processor and a memory that stores executable instructions that when executed by the processor cause the apparatus to determine a first pilot channel transmission power level for a first uplink carrier. The executable instructions of this embodiment when executed also cause the apparatus to determine a second pilot channel transmission power level for a second uplink carrier. The executable instructions of this embodiment when executed further cause the apparatus to prioritize the first and second uplink carriers based at least in part upon the first and second pilot channel transmission power levels.

In another exemplary embodiment, an apparatus is provided, which includes means for determining a first pilot channel transmission power level for a first uplink carrier. The apparatus of this embodiment further includes means for determining a second pilot channel transmission power level for a second uplink carrier. The apparatus of this embodiment additionally includes means for prioritizing the first and second uplink carriers based at least in part upon the first and second pilot channel transmission power levels.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

Figure 4A:
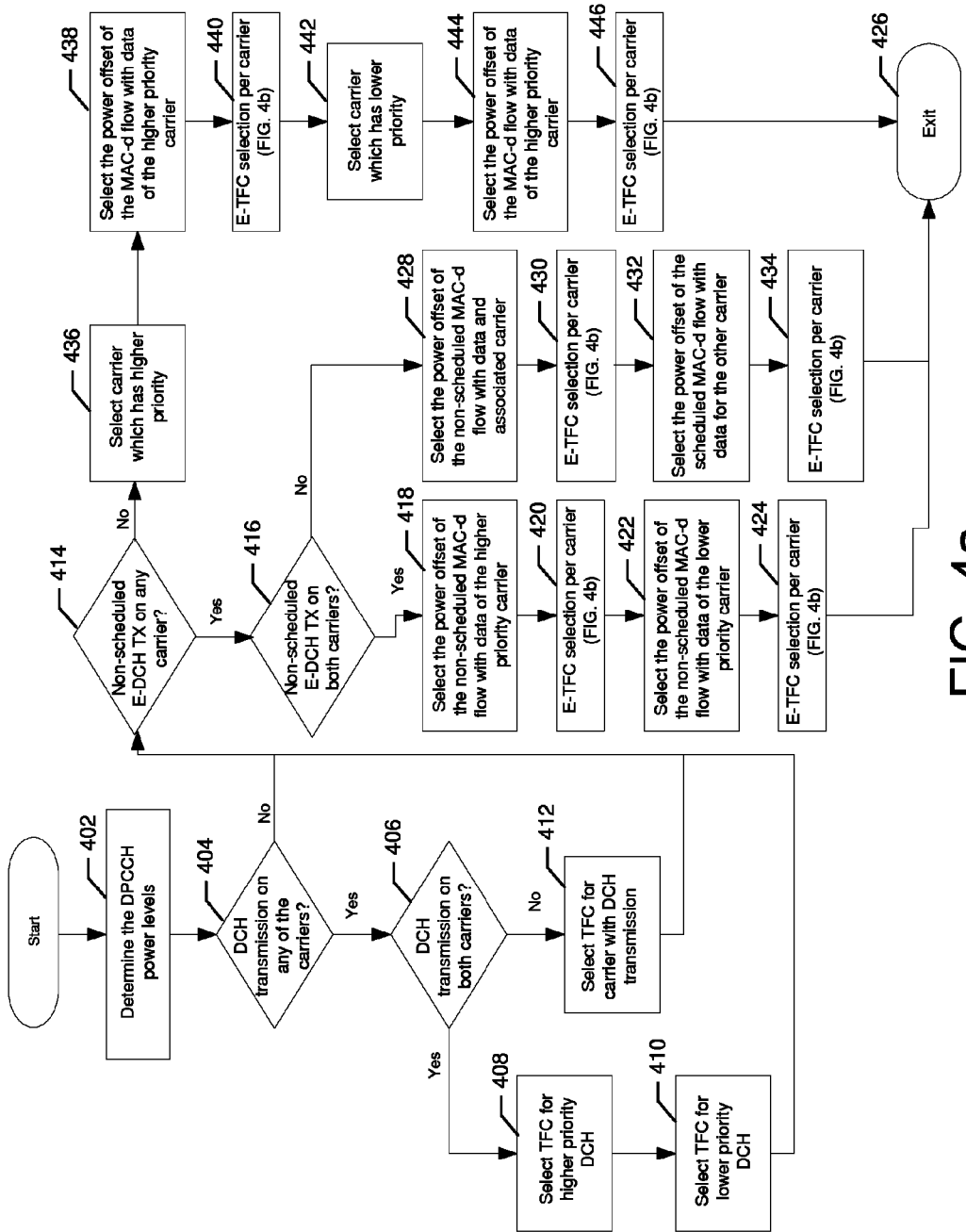
Figure 4B:
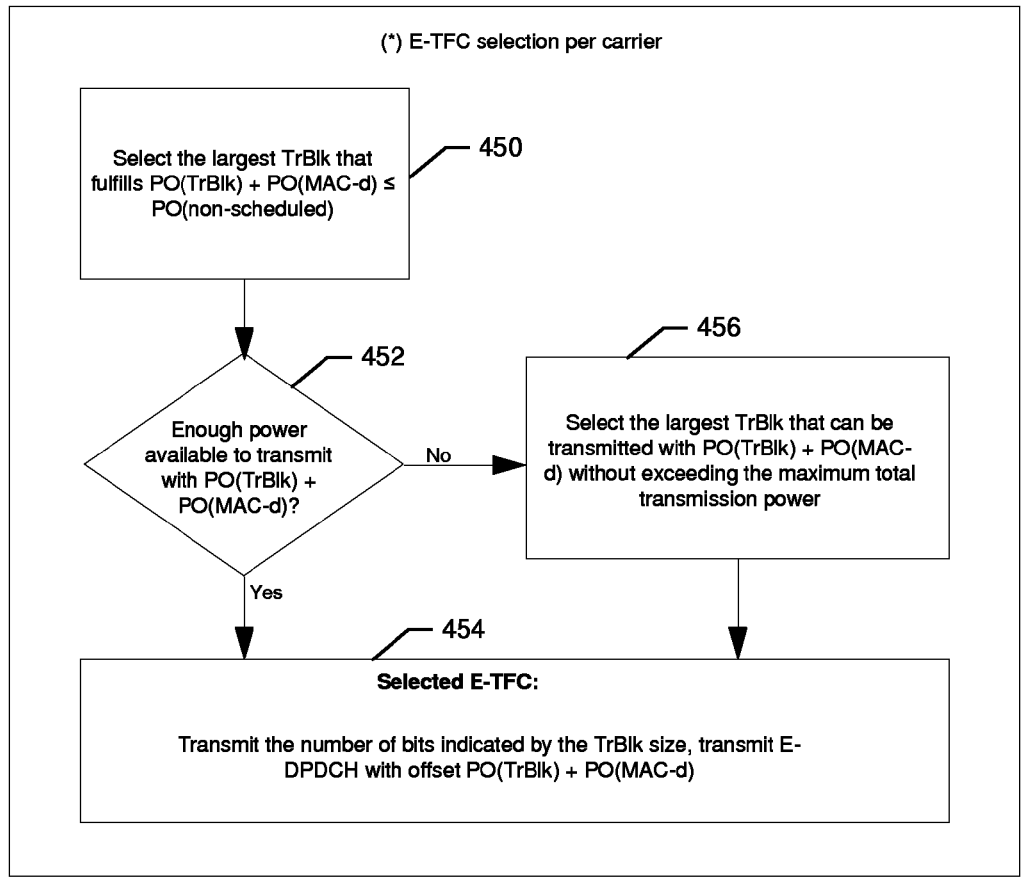
Figure 5:
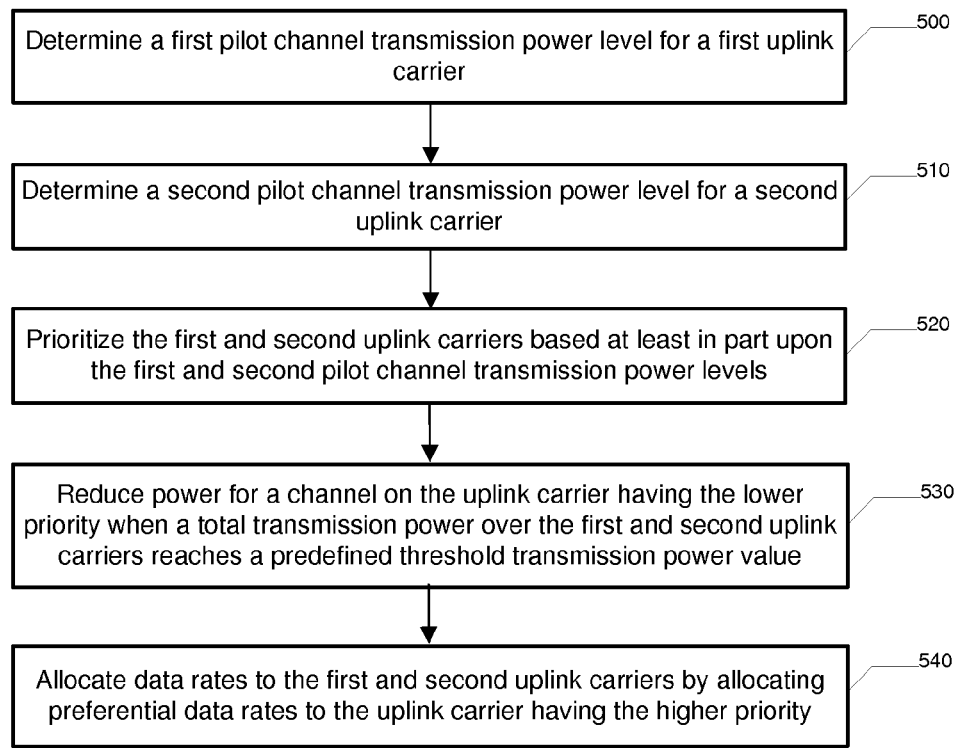
Figure 6:
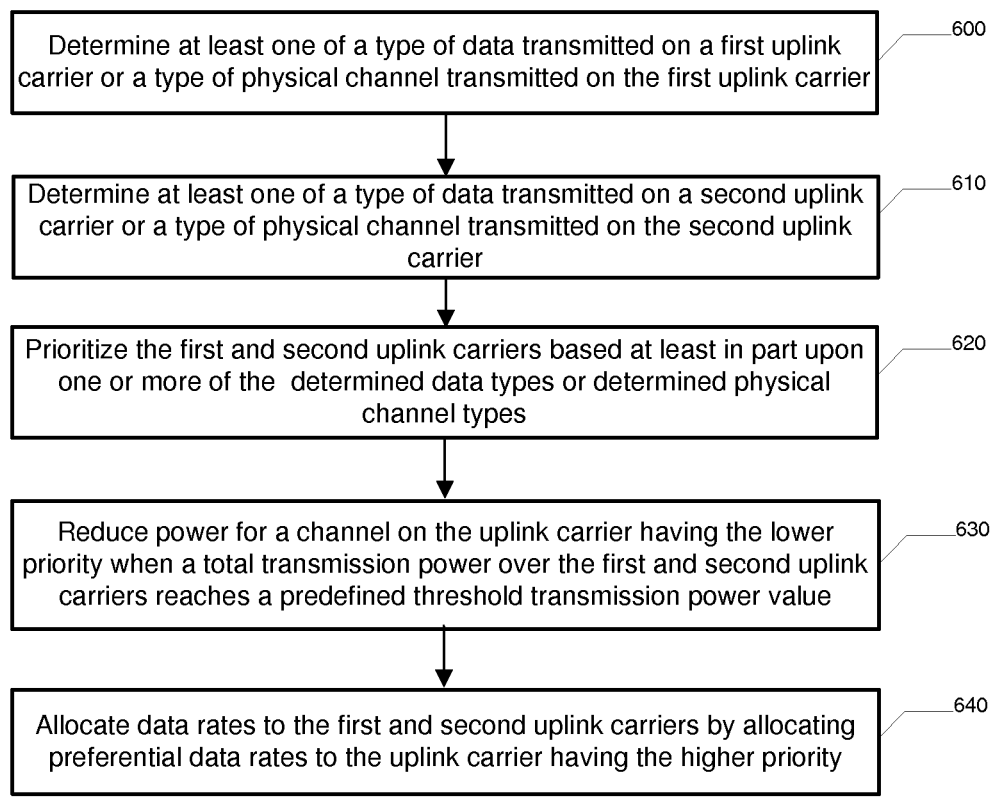

FIG. 4 illustrates a flowchart according to an exemplary method for allocating data rates to an uplink carrier in a dual uplink carrier scenario based at least in part upon prioritization of uplink carriers according to an exemplary embodiment of the invention; and FIGS. 5-6 illustrate flowcharts according to exemplary methods for prioritizing uplink carriers in computing devices such that computing devices may intelligently implement power scaling and/or allocate data rates to an uplink carrier in dual uplink carrier scenarios according to exemplary embodiments of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
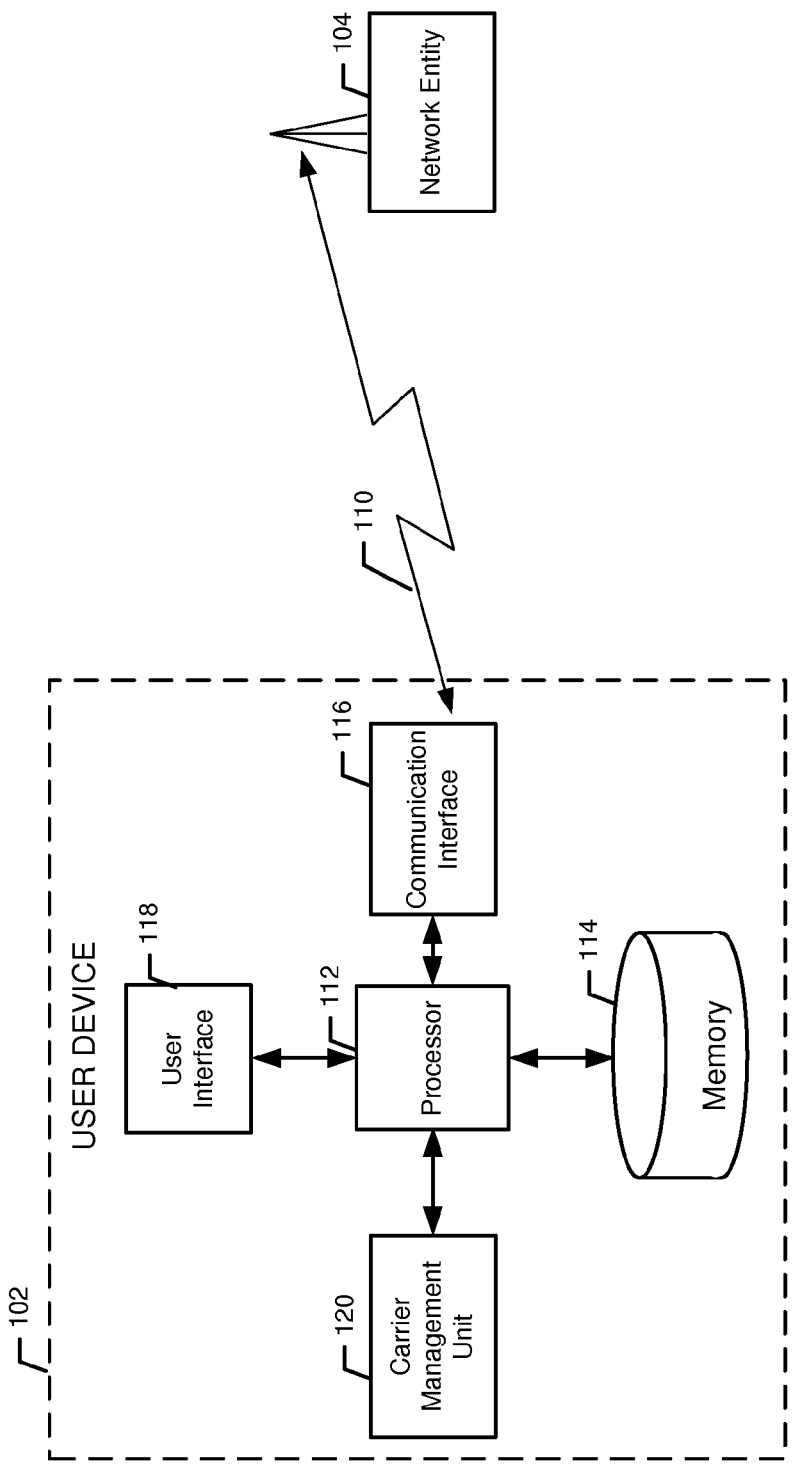
FIG. 1 illustrates a system for prioritizing uplink carriers according to an exemplary embodiment of the present invention.

FIG. 1 illustrates a block diagram of a system 100 for prioritizing uplink carriers in computing devices such that computing devices may intelligently implement power scaling and/or allocate data rates to an uplink carrier in a multiple uplink carrier scenario according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for prioritizing uplink carriers, numerous other configurations may also be used to implement embodiments of the present invention. Further, it will be appreciated that dual uplink carrier scenarios are described herein merely purposes of example and embodiments of the invention are applicable to any multiple uplink carrier scenario. Thus, embodiments of the invention may also be applied to situations wherein a computing device is transmitting on three or more uplink carriers.

In at least some embodiments, the system 100 includes a user device 102 and one or more network entities 104 configured to communicate over a wireless communication link 110. A network entity 104 may be embodied as any computing device or plurality of computing devices configured to provide network services, such as access to a network, to the user device 102 over the communication link 110. In this regard, a network entity 104 may comprise, for example, a network access point providing a user device 102 with wireless access to a wireless (e.g., cellular) network, wired network, or some combination thereof. In some embodiments, the network entity 104 may provide a user device 102 with wireless access to the Internet. In some embodiments, the network entity 104 comprises a base station (BS) and provides the user device 102 with wireless access to a cellular network and/or the Internet. When comprising a BS, the network entity 104 may provide network access to a user device 102 over the communication link 110 in accordance with UTRAN standards.

A user device 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to establish a communication link 110 with the network entity 104 in order to access network services provided by the network entity 104. In this regard, a user device 102 may be configured to communicate with the network entity 104 through the use of uplink carrier signals. In some embodiments, the user device 102 comprises a user equipment (UE) device, which may be configured to access a cellular network through the network entity 104 in accordance with UTRAN standards. In an exemplary embodiment, a user device 102 is embodied as a mobile terminal, such as that illustrated in FIG. 2.

Figure 2:
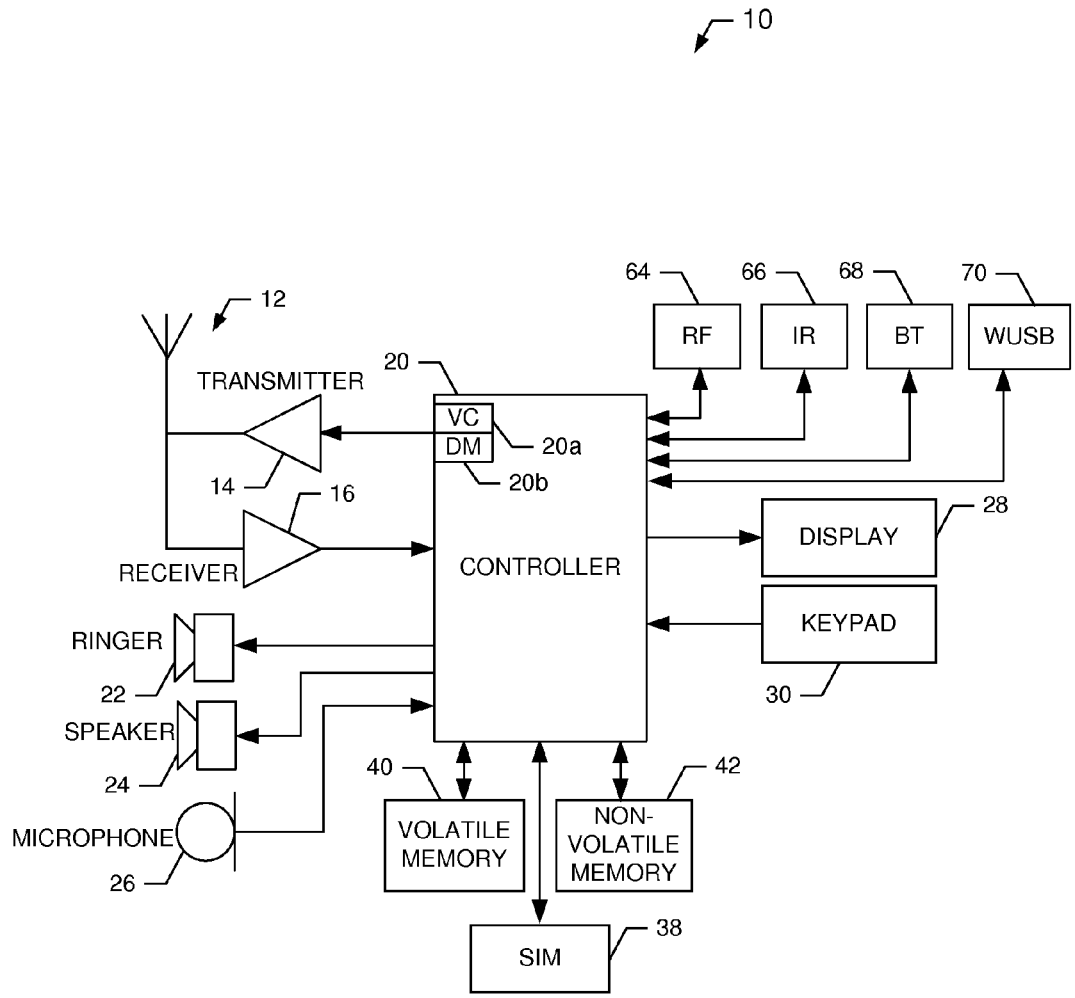
FIG. 2 is a schematic block diagram of a mobile terminal according to an exemplary embodiment of the present invention.

In this regard, FIG. 2 illustrates a block diagram of a mobile terminal 10 representative of one embodiment of a user device 102 in accordance with embodiments of the present invention. It should be understood, however, that the mobile terminal 10 illustrated and hereinafter described is merely illustrative of one type of user device 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an exemplary embodiment, the user device 102 includes various means, such as a processor 112, memory 114, communication interface 116, user interface 118, and carrier management unit 120 for performing the various functions herein described. These means of the user device 102 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 114) that is executable by a suitably configured processing device (e.g., the processor 112), or some combination thereof.

The processor 112 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 112 comprises a plurality of processors. The plurality of processors may be in operative communication with each other and may be collectively configured to perform one or more functionalities of the user device 102 as described herein. In an exemplary embodiment, the processor 112 is configured to execute instructions stored in the memory 114 or otherwise accessible to the processor 112.

The memory 114 may include, for example, volatile and/or non-volatile memory. Although illustrated in FIG. 1 as a single memory, the memory 114 may comprise a plurality of memories, which may include volatile memory, non-volatile memory, or some combination thereof. In this regard, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the user device 102 to carry out various functions in accordance with exemplary embodiments of the present invention. For example, in at least some embodiments, the memory 114 is configured to buffer input data for processing by the processor 112. Additionally or alternatively, in at least some embodiments, the memory 114 is configured to store program instructions for execution by the processor 112. The memory 114 may store information in the form of static and/or dynamic information. This stored information may be stored and/or used by the carrier management unit 120 during the course of performing its functionalities.

The communication interface 116 may be embodied as any device or means embodied in hardware, a computer program product comprising computer readable program instructions stored on a computer readable medium (e.g., the memory 114) and executed by a processing device (e.g., the processor 112), or a combination thereof that is configured to receive and/or transmit data from/to a remote device, such as the network entity 104 over the communication link 110. In at least one embodiment, the communication interface 116 is at least partially embodied as or otherwise controlled by the processor 112. The communication interface 116 may include, for example, an antenna, a transmitter, a receiver, a transceiver and/or supporting hardware or software for enabling communications with other entities of the system 100. The communication interface 116 may be configured to receive and/or transmit data using any protocol that may be used for communications between computing devices of the system 100. The communication interface 116 may additionally be in communication with the memory 114, user interface 118, and/or carrier management unit 120, such as via a bus.

The user interface 118 may be in communication with the processor 112 to receive an indication of a user input and/or to provide an audible, visual, mechanical, or other output to the user. As such, the user interface 118 may include, for example, a keyboard, a mouse, a joystick, a display, a touch screen display, a microphone, a speaker, and/or other input/output mechanisms. The user interface 118 may be in communication with the memory 114, communication interface 116, and/or carrier management unit 120, such as via a bus.

The carrier management unit 120 may be embodied as various means, such as hardware, a computer program product comprising computer readable program instructions stored on a computer readable medium (e.g., the memory 114) and executed by a processing device (e.g., the processor 112), or some combination thereof and, in one embodiment, is embodied as or otherwise controlled by the processor 112. In embodiments where the carrier management unit 120 is embodied separately from the processor 112, the carrier management unit 120 may be in communication with the processor 112. The carrier management unit 120 may further be in communication with the memory 114, communication interface 116, and/or user interface 118, such as via a bus.

In at least some embodiments, the carrier management unit 120 is configured to establish and manage one or more uplink carriers between the user device 102 and the network entity 104. The carrier management unit 120 may be configured to establish one or more uplink carriers between the user device 102 and network entity 104 so as to implement a high speed uplink package access (HSUPA) system. In order to manage uplink carriers, the carrier management unit 120 is configured to prioritize an uplink carrier. In this regard, the carrier management unit 120 may prioritize uplink carriers based at least in part on what type of physical (e.g., transport) channel(s) is being transmitted over the uplink carrier(s), what type of data is being transmitted on the respective uplink carriers, transmitted logical channel priorities, pilot channel transmission power level for an uplink carrier(s), whether a high speed dedicated physical control channel (HS-DPCCH) is being transmitted over any of the uplink carriers, and/or the like.

In embodiments wherein the carrier management unit 120 prioritizes uplink carriers based at least in part upon a type of data transmitted on the respective uplink carriers and/or upon what type of transport channel(s) is being transmitted over the respective uplink carriers, the carrier management unit 120 is configured to determine what type(s) of data and/or physical channel(s) are being transmitted over the respective uplink carriers which it is prioritizing. The carrier management unit 120 may then prioritize the uplink carriers based at least in part upon the determined types. In this regard, each logical channel type may have a discrete priority within a hierarchy of logical channels. For example, an uplink carrier on which a HS-DPCCH is transmitted may be assigned a higher priority than an uplink carrier on which a HS-DPCCH is not transmitted.

In embodiments wherein the carrier management unit 120 prioritizes uplink carriers based at least in part upon pilot channel transmission power levels for the respective uplink carriers, the carrier management unit 120 is configured to determine a pilot channel transmission power level for the respective uplink carriers which it is prioritizing. The carrier management unit 120 may be further configured to assign a first uplink carrier having a lower pilot channel transmission power level than a second uplink carrier a higher priority than the second uplink carrier. In some embodiments, the pilot channel transmission power level may comprise a dedicated physical control channel (DPCCH) power level and accordingly the carrier management unit 120 may be configured to determine a DPCCH power level for an uplink carrier and prioritize uplink carriers based at least in part upon their respective DPCCH power levels.

The carrier management unit 120 may be configured to manage power allocated to and/or consumed by an uplink carrier. The carrier management unit 120 may use closed loop power control. In at least some embodiments, the carrier management unit 120 is configured to implement power scaling on one or more uplink carrier channels based at least in part upon prioritization of uplink carriers. In this regard, the carrier management unit 120 may be power limited and/or enforce a maximum transmission power limit such that the total transmission power for established uplink carriers cannot exceed a predetermined maximum value. In managing established uplink carriers, the carrier management unit 120 may be configured to reduce power for a channel on an uplink carrier such that the total transmission power for established uplink carriers does not meet and/or exceed the maximum allowable transmission power value. Accordingly, the carrier management unit 120 is configured in one embodiment to determine whether the total transmission value for one or more uplink carriers is greater than or equal to a predefined threshold power value. The predefined threshold power value may be equivalent to the maximum allowable transmission power level or may comprise a value less than the maximum allowable transmission power level.

When the carrier management unit 120 determines that the total transmission value for one or more uplink carriers has reached (e.g., greater than or equal to) the predefined threshold power value, the carrier management unit 120 may reduce power for a channel on an uplink carrier. In at least some embodiments, the carrier management unit 120 reduces power for a channel on a first uplink carrier having a lower priority than a second uplink carrier. The uplink carriers may have been prioritized prior to the determination that the total transmission value has reached the predefined threshold power value and/or the carrier management unit 120 may prioritize the uplink carriers in response to the determination that the total transmission value has reached the predefined threshold power value. Thus, for example, the carrier management unit 120 may reduce power for a channel on an uplink carrier having a higher pilot channel transmission power level (e.g., a higher DPCCH power level) than a second uplink carrier because the uplink carrier having a higher pilot channel transmission power level may cause more interference at the network entity 104 and/or may be less link efficient than the uplink carrier having a lower pilot channel transmission power level. The carrier management unit 120 may reduce power for a channel on a lower priority uplink carrier by scaling down a channel gain factor. In some embodiments, wherein an uplink carrier is transmitting an enhanced dedicated physical data channel (E-DPDCH), the carrier management unit 120 is configured to scale down the E-DPDCH gain factor. The carrier management unit 120 may be configured to scale down a gain factor $\beta_{ed,k}$ to a value $\beta_{ed,k,reduced}$.

If reducing power for one or more channels on an uplink carrier(s) does not sufficiently reduce total power transmission such that it does not exceed the predefined threshold power value, the carrier management unit 120 may be configured to implement one or more fallback mechanisms. For example, if there is not sufficient power on any of the uplink carriers to transmit an E-DPDCH with minimum power offset, the carrier management unit 120 may be configured to send a request to the network entity 104 to move to a single uplink carrier transmission. Additionally or alternatively, the network entity 104 may note a low uplink power headroom (UPH) value on uplink carriers established between the user device 102 and network entity 104 and may signal a decision (e.g., to the user device 102) to change dual or multi-carrier mode to single carrier mode such that the user device 102 only utilizes a single uplink carrier. The carrier management unit 120 may be configured to implement a gating mode on at least one carrier when a DPCCH power level on an uplink carrier reaches or exceeds a threshold value. The carrier management unit 120 may be configured to implement the gating mode on all but one carrier when a DPCCH power level on an uplink carrier reaches or exceeds a threshold value.

In at least some embodiments, the carrier management unit 120 is configured to allocate data rates to an uplink carrier in a dual or other multiple uplink carrier scenario based at least in part upon the prioritization of the respective uplink carriers. In this regard, the carrier management unit 120 may perform transport format combination (TFC) and/or enhanced transport format combination (E-TFC) selection based at least in part upon the prioritization of the respective uplink carriers. The carrier management unit 120 may be configured to allocate preferential data rates to a first uplink carrier having a higher priority than a second uplink carrier.

Figure 3:
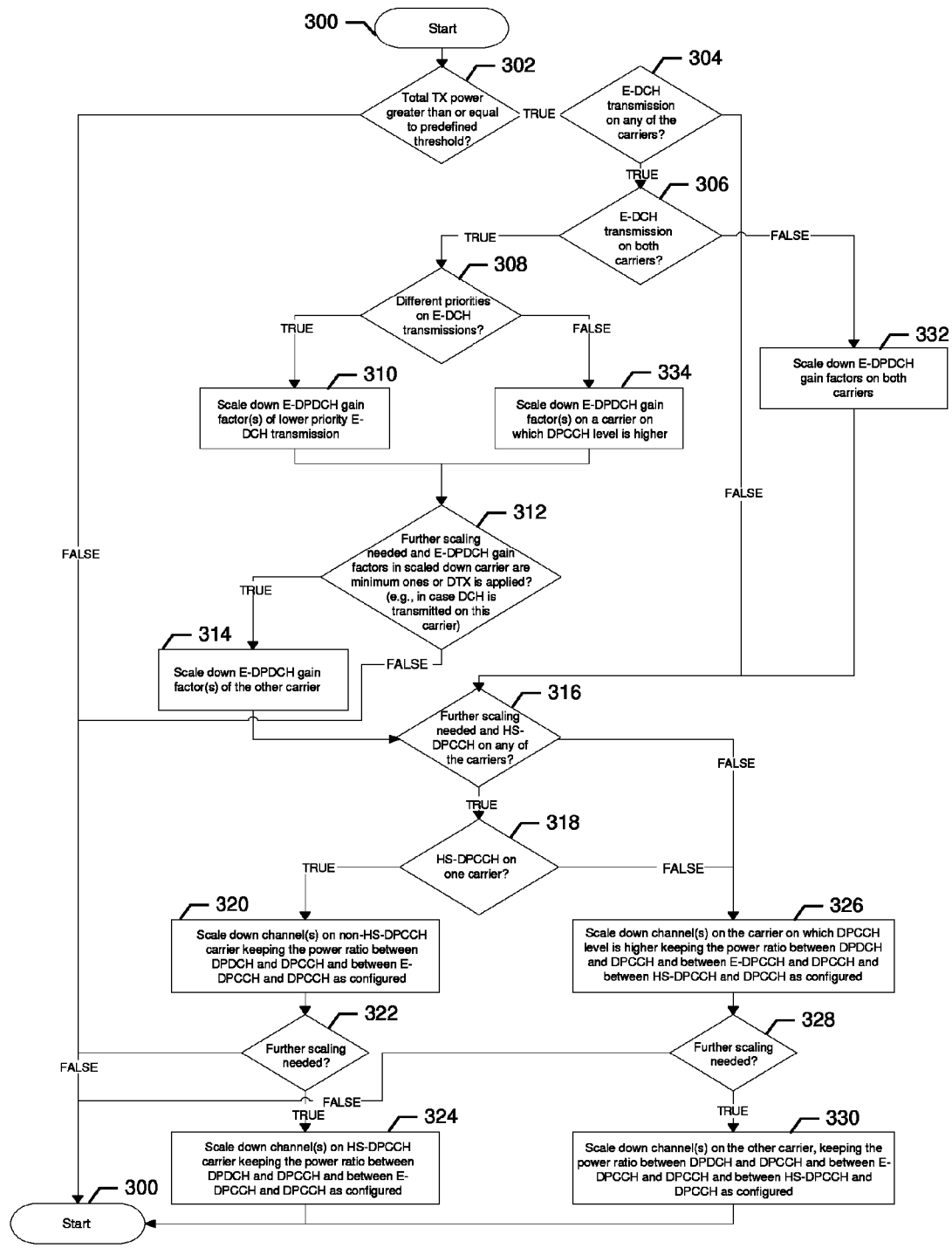
FIG. 3 illustrates a flowchart according to an exemplary method for a flowchart according to an exemplary method for implementing power scaling on an uplink carrier channel based at least in part upon prioritization of uplink carriers according to an exemplary embodiment of the present invention.

FIG. 3 illustrates a flowchart according to an exemplary method for implementing power scaling on an uplink carrier channel based at least in part upon prioritization of uplink carriers according to an exemplary embodiment of the invention. The example method shown in FIG. 3 relates to a dual uplink carrier scenario, but it will be appreciated that the method may be scaled to scenarios wherein three or more uplink carriers are implemented. The method may start at operation 300, after which the carrier management unit 120 may determine whether the total transmission (TX) power for the uplink carriers is greater than or equal to the predefined threshold transmission power value, at operation 302. If not, then the carrier management unit 120 may be configured to exit the method operation or may return to start operation 300 such that the carrier management unit 120 operates a monitoring loop to manage transmission power level for active uplink carriers.

If the carrier management unit 120 determines at operation 302 that the total transmission power is greater than or equal to the predefined threshold transmission power value, the carrier management unit 120 may determine at operation 304 whether an enhanced dedicated channel (E-DCH) is being transmitted on any of the uplink carriers. If an E-DCH is being transmitted on any of the uplink carriers, the carrier management unit 120 may determine, at operation 306, whether an E-DCH is being transmitted on both carriers. If, an E-DCH is only transmitted on one of the carriers, operation 332 may comprise the carrier management unit 120 scaling down E-DPDCH gain factors on both uplink carriers.

If the carrier management unit 120 determines at operation 306 that an E-DCH is transmitted on both carriers, the carrier management unit 120 may determine, at operation 308, whether there are different priorities on the respective E-DCH transmissions. In this regard, the carrier management unit 120 may prioritize the transmission, for example, based at least in part upon what type of data is being transmitted on the transmissions. If there are different priorities on the E-DCH transmissions, the carrier management unit 120 may scale down E-DPDCH gain factor(s) of the lower priority E-DCH transmission, at operation 310. If, however, there are not different priorities on the E-DCH transmissions, the carrier management unit 120 may scale down E-DPDCH gain factor(s) on the uplink carrier on which the DPCCH power level is higher (e.g., the lower priority uplink carrier), at operation 334.

Operation 312 may then comprise the carrier management unit 120 determining whether further scaling is needed such that total transmission power is less than the predefined threshold value and whether E-DPDCH gain factors in the scaled down uplink carrier(s) are the minimum allowable gain factors. In this regard, operation 312 may comprise the carrier management unit 120 determining whether discontinuous transmission (DTX) is applied (e.g., no data is sent) on E-DPDCH in case a dedicated channel (DCH) is transmitted on an uplink carrier, as DCH transmission may have priority over any E-DPDCH transmission and E-DPDCH may be scaled down to DTX to provide sufficient power to support DCH transmission. If the carrier management unit 120 determines that further scaling is not needed and/or that E-DPDCH gain factors are not scaled down to their minimum value, the method may return to operation 300. If, however, any of the conditions determined in operation 312 are true, the carrier management unit 120 may scale down the E-DPDCH gain factor(s) of the other uplink carrier (e.g., the higher priority uplink carrier), at operation 314. In this regard, the carrier management unit 120 may be configured to prioritize a DCH transmission over an E-DCH transmission and scale down the E-DPDCH gain factor(s) of the other uplink carrier until there is sufficient power available to transmit DCH on the carrier with nominal power. Additionally, DCH and E-DCH may be transmitted on the same carrier following scaling down of the E-DPDCH gain factor(s).

Operation 316 may then comprise the carrier management unit 120 determining whether further scaling is needed and whether a HS-DPCCH is being transmitted on any of the carriers. If true, the carrier management unit 120 may then determine whether a HS-DPCCH is being transmitted on only one uplink carrier, at operation 318. If a HS-DPCCH is only being transmitted on one uplink carrier, operation 320 may comprise the carrier management unit 120 scaling down channel(s) on the non-HS-DPCCH carrier and keeping the power ratio between DPDCH and DPCCH and/or between enhanced dedicated physical control channel (E-DPCCH) and DPCCH as previously configured. Operation 322 may then comprise the carrier management unit 120 determining whether further scaling is needed so that the total transmission power is less than the predefined threshold transmission power value. If further scaling is not needed, the method may return to operation 300. If, however, further scaling is needed, operation 324 may comprise the carrier management unit 120 scaling down one or more channels on the carrier on which a HS-DPCCH is transmitted while keeping the power ratio between DPDCH and DPCCH and/or between E-DPCCH and DPCCH as previously configured. The method may then return to operation 300.

If, however, the carrier management unit 120 determines at operation 316 that a HS-DPCCH is not transmitted on any of the carriers or determines at operation 318 that a HS-DPCCH is transmitted on both carriers, the method may proceed to operation 326. Operation 326 may comprise the carrier management unit 120 scaling down one or more channels on the carrier on which the DPCCH power level is determined to be higher (e.g., the lower priority uplink carrier) and keeping the power ratio between DPDCH and DPCCH, between E-DPCCH and DPCCH, and/or between HS-DPCCH and DPCCH as previously configured. Operation 328 may then comprise the carrier management unit 120 determining whether further scaling is needed so that the total transmission power is less than the predefined threshold transmission power value. If further scaling is not needed, the method may return to operation 300. If, however, further scaling is needed, operation 330 may comprise the carrier management unit 120 scaling down one or more channels on the higher priority carrier and keeping the power ratios between DPDCH and DPCCH, between E-DPCCH and DPCCH, and/or between HS-DPCCH and DPCCH as previously configured. The method may then return to operation 300.

FIG. 4 illustrates flowcharts according to an exemplary method for allocating data rates to an uplink carrier in a dual uplink carrier scenario based at least in part upon prioritization of uplink carriers according to an exemplary embodiment of the invention. Although the example method illustrated in FIG. 4 relates to a dual uplink carrier scenario, it will be appreciated that the method may be scaled to scenarios wherein three or more uplink carriers are implemented. With reference to FIG. 4a, the method may include the carrier management unit 120 determining the DPCCH power levels of the uplink carriers and prioritizing the uplink carriers based at least in part upon the determined DPCCH power levels, at operation 402. Operation 404 may comprise the carrier management unit 120 determining whether a DCH is transmitted on any of the uplink carriers. If a DCH is not transmitted on any of the uplink carriers, the method may proceed to operation 414, which is described below.

If the carrier management unit 120 determines that a DCH is transmitted on any of the uplink carriers, operation 406 may comprise the carrier management unit 120 determining whether a DCH is transmitted on both uplink carriers. If a DCH is transmitted on both carriers, operation 408 may comprise the carrier management unit 120 selecting TFC for the higher priority uplink carrier. The higher priority uplink carrier may comprise, for example, the uplink carrier with a lower DPCCH power level and/or the uplink carrier for which higher priority data is transmitted on the DCH. Operation 410 may comprise the carrier management unit 120 selecting TFC for the lower priority DCH. If, however, DCH transmission is only on one uplink carrier, operation 412 may comprise the carrier management unit 120 selecting TFC for the uplink carrier with DCH transmission.

Operation 414 may then comprise the carrier management unit 120 determining whether a non-scheduled E-DCH is transmitted on an uplink carrier. If a non-scheduled E-DCH is transmitted on an uplink carrier, operation 416 may comprise the carrier management unit 120 determining whether a non-scheduled E-DCH is transmitted on both uplink carriers. If a non-scheduled E-DCH is transmitted on both carriers, the carrier management unit 120 may select the power offset of the non-scheduled medium access control-dedicated (MAC-d) flow with data of the higher priority uplink carrier (e.g., the carrier with a lower DPCCH power level), at operation 418. Operation 420 may then comprise the carrier management unit 120 performing E-TFC selection per carrier.

The process for selection of E-TFC per carrier in operation 420 (as well as in operations 424, 430, 434, 440, and 446) is illustrated in FIG. 4b. Referring now to FIG. 4b, the process may comprise the carrier management unit 120 selecting the largest transport block (TrBlk) that fulfills the requirement Power Offset (PO) (TrBlk)+PO(MAC-d)≤PO(non-scheduled), at operation 450. In this regard, a TrBlk may comprise the number of bits to be sent in one transmission time interval. Accordingly, E-TFC selection may select the data rate to be used in the next transmission time interval by selecting a TrBlk size. Operation 452 may comprise the carrier management unit 120 determining whether for the TrBlk selected in operation 450 there is enough power available to transmit with PO(TrBlk)+PO(MAC-d). If there is enough power, then the carrier management unit 120 selects E-TFC such that the carrier management unit 120 transmits the number of bits indicated by the TrBlk size selected in operation 450 and transmits E-DPDCH with offset PO(TrBlk)+PO(MAC-d).

If, however, the carrier management unit 120 determines at operation 452 that there is not enough power available, the carrier management unit 120 selects the largest TrBlk that can be transmitted with PO (TrBlk)+PO(MAC-d) without exceeding the maximum total transmission power (or in some embodiments, the predefined threshold transmission power value used for power scaling), at operation 456. Operation 450 may then comprise the carrier management unit 120 transmitting the number of bits indicated by the TrBlk size selected in operation 456 rather than that selected in operation 450 and transmitting E-DPCH with offset PO(TrBlk)+PO (MAC-d).

Referring again to FIG. 4a, operation 422 may comprise the carrier management unit 120 selecting the power offset of the non-scheduled MAC-d flow with data of the lower priority uplink carrier. Operation 424 may then comprise the carrier management unit 120 performing E-TFC selection per carrier in accordance with the process illustrated in FIG. 4b. The method may then terminate at operation 426.

If, however, at operation 416 the carrier management unit 120 determines that non-scheduled E-DCH is not transmitted on both carriers, operation 428 may comprise the carrier management unit 120 selecting the power offset of the non-scheduled MAC-d flow with data for the uplink carrier on which a non-scheduled E-DCH is transmitted. Operation 430 may then comprise the carrier management unit 120 performing E-TFC selection per carrier in accordance with the process illustrated in FIG. 4b. The carrier management unit 120 may then select the power offset of the scheduled MAC-d flow with data for the other uplink carrier (e.g., the uplink carrier without non-scheduled E-DCH transmission), at operation 432. Operation 434 may then comprise the carrier management unit 120 performing E-TFC selection per carrier in accordance with the process illustrated in FIG. 4b. The method may then terminate at operation 426.

If, however, at operation 414, the carrier management unit 120 determines that a non-scheduled E-DCH is not transmitted on any of the uplink carriers, operation 436 may comprise the carrier management unit 120 selecting the carrier with the higher priority (e.g., based upon the determined DPCCH power levels with the carrier having a lower DPCCH power level being allocated the higher priority). Operation 438 may then comprise the carrier management unit 120 selecting the power offset of the MAC-d flow with data of the higher priority carrier. The carrier management unit 120 may then perform E-TFC per carrier in accordance with the process illustrated in FIG. 4b, at operation 440. Operation 442 may then comprise the carrier management unit 120 selecting the uplink carrier having the lower priority (e.g., the uplink carrier with the higher DPCCH power level). The carrier management unit 120 may then select the power offset of the MAC-d flow with data of the higher priority uplink carrier, at operation 444. Operation 446 may then comprise the carrier management unit 120 performing E-TFC per carrier in accordance with the process illustrated in FIG. 4b. The method may then terminate at operation 426.

FIG. 5 illustrates a flowchart according to an exemplary method for prioritizing uplink carriers in computing devices such that computing devices may intelligently implement power scaling and/or allocate data rates to an uplink carrier in dual uplink carrier scenarios according to an exemplary embodiment of the present invention. The method may include the carrier management unit 120 determining a first pilot channel transmission power level (e.g., the DPCCH power level) for a first uplink carrier, at operation 500. Operation 510 may comprise the carrier management unit 120 determining a second pilot channel transmission power level for a second uplink carrier. Operation 520 may comprise the carrier management unit 120 prioritizing the first and second uplink carriers based at least in part upon the first and second pilot channel transmission power levels. In this regard, the carrier management unit 120 may allocate a higher priority to the uplink carrier with a lower pilot channel transmission power level. The carrier management unit 120 may also use other factors in prioritizing the uplink carriers, such as what type(s) of data is transmitted on the respective uplink carriers.

In some embodiments, the carrier management unit 120 may reduce power for a channel on the uplink carrier having a lower priority when a total transmission power over the first and second uplink carriers reaches (e.g., is equal to or exceeds) a predefined threshold transmission power value, at operation 530. In this regard, the carrier management unit 120 may scale down a channel (e.g., an E-DPDCH) gain factor. Operation 540 may comprise the carrier management unit 120 allocating data rates (e.g., through TFC and/or E-TFC selection) to the first and second uplink carriers based at least in part upon the priorities of the uplink carriers with preferential data rates allocated to the uplink carrier with the higher priority. It will be appreciated, however, that the order of operations 530 and 540 may be reversed. Further, either or both of operations 530 and 540 may not occur.

FIG. 6 illustrates a flowchart according to an exemplary method for prioritizing uplink carriers in computing devices such that computing devices may intelligently implement power scaling and/or allocate data rates to an uplink carrier in dual uplink carrier scenarios according to an exemplary embodiment of the present invention. The method may include the carrier management unit 120 determining at least one of a type of data transmitted on a first uplink carrier or a type of physical channel transmitted on the first uplink carrier, at operation 600. Operation 610 may comprise the carrier management unit 120 determining at least one of a type of data transmitted on a second uplink carrier or a type of physical channel transmitted on the second uplink carrier. Operation 620 may comprise the carrier management unit 120 prioritizing the first and second uplink carriers based at least in part upon one or more of the determined data types or determined physical channel types. The carrier management unit 120 may also use other factors in prioritizing the uplink carriers, such as pilot channel transmission power level for the respective uplink carriers. Accordingly, for example, operations 500 and 510 illustrated and described in connection with the method illustrated in FIG. 5 may also be performed in the method illustrated and described in connection with the method illustrated in FIG. 6 prior to operation 620.

In some embodiments, the carrier management unit 120 may reduce power for a channel on the uplink carrier having a lower priority when a total transmission power over the first and second uplink carriers reaches (e.g., is equal to or exceeds) a predefined threshold transmission power value, at operation 630. In this regard, the carrier management unit 120 may scale down a channel (e.g., an E-DPDCH) gain factor. Operation 640 may comprise the carrier management unit 120 allocating data rates (e.g., through TFC and/or E-TFC selection) to the first and second uplink carriers based at least in part upon the priorities of the uplink carriers with preferential data rates allocated to the uplink carrier with the higher priority. It will be appreciated, however, that the order of operations 630 and 640 may be reversed. Further, either or both of operations 630 and 640 may not occur.

FIGS. 3-6 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the instructions of the computer program product which execute on the computer or other programmable apparatus create means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture including instruction means which implement the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, computing device users, and network service providers. Embodiments of the invention facilitate intelligent implementation of power scaling and/or data rate allocation to an uplink carrier when a computing device is implementing multiple uplink carriers through prioritization of the uplink carriers. At least some embodiments of the invention provide systems, methods, computer program products, and apparatuses enabling a computing device to handle situations in multi-carrier transmission when the computing device starts to run short of transmission power. Embodiments of the invention provide for prioritization of uplink carriers and enable power scaling of lower priority uplink carriers so as to preserve quality of service and also reduce interference at a network entity, such as a base station.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining a first pilot channel transmission power level for a first uplink carrier;
   determining a second pilot channel transmission power level for a second uplink carrier;
   prioritizing, with a carrier management unit, the first and second uplink carriers based at least in part upon the first and second pilot channel transmission power levels; and
   reducing power for a channel on the one of the first and second uplink carriers having a lower priority than the other uplink carrier when a total transmission power over the first and second uplink carriers reaches a predefined threshold value;
   wherein reducing power for a channel comprises scaling down an enhanced dedicated physical data channel gain factor; and
   wherein scaling down the enhanced dedicated physical data channel gain factor comprises scaling down the enhanced dedicated physical data channel gain factor $\beta_{ed,k}$ to a value $\beta_{eci,k}$, reduced.

2. The method of claim 1, wherein prioritizing the first and second uplink carriers comprises assigning a higher priority to the one of the first and second uplink carriers having a lower pilot channel transmission power level than the other uplink carrier.

3. The method of claim 1, wherein: determining a first and second pilot channel transmission power level comprises determining a first and second dedicated physical control channel power level; and prioritizing the first and second uplink carriers comprises prioritizing the first and second uplink carriers based at least in part upon the first and second dedicated physical control channel power levels.

4. The method of claim 1, further comprising allocating data rates to the first and second uplink carriers, wherein preferential data rates are allocated to the one of the first and second uplink carriers having a higher priority than the other uplink carrier.

5. A computer program product comprising at least one computer-readable storage medium having computer-readable program instructions stored therein, the computer-readable program instructions comprising instructions for:
  determining a first pilot channel transmission power level for a first uplink carrier;
  determining a second pilot channel transmission power level for a second uplink carrier;
  prioritizing the first and second uplink carriers based at least in part upon the first and second pilot channel transmission power levels; and
  reducing power for a channel on the one of the first and second uplink carriers having a lower priority than the other uplink carrier when a total transmission power over the first and second uplink carriers reaches a predefined threshold value;
  wherein the instructions for reducing power for a channel comprise instructions for scaling down an enhanced dedicated physical data channel gain factor, and
  wherein the instructions for scaling down the enhanced dedicated physical data channel gain factor comprise instructions for scaling down the enhanced dedicated physical data channel gain factor $\beta_{eci,k}$ to a value $\beta_{eci,k}$, reduced.

6. The computer program product of claim 5, wherein the program instruction for prioritizing the first and second uplink carriers comprises instructions for assigning a higher priority to the one of the first and second uplink carriers having a lower pilot channel transmission power level than the other uplink carrier.

7. The computer program product of claim 5, wherein: the program instruction for determining a first and second pilot channel transmission power level comprises instructions for determining a first and second dedicated physical control channel power level; and the program instruction for prioritizing the first and second uplink carriers comprises instructions for prioritizing the first and second uplink carriers based at least in part upon the first and second dedicated physical control channel power levels.

8. The computer program product of claim 5, further comprising a program instruction for allocating data rates to the first and second uplink carriers, wherein preferential data rates are allocated to the one of the first and second uplink carriers having a higher priority than the other uplink carrier.

9. An apparatus comprising a processor and a memory storing executable instructions that when executed by the processor cause the apparatus to at least:
  determine a first pilot channel transmission power level for a first uplink carrier;
  determine a second pilot channel transmission power level for a second uplink carrier;
  prioritize the first and second uplink carriers based at least in part upon the first and second pilot channel transmission power levels; and
  reduce power for a channel on the one of the first and second uplink carriers having a lower priority than the other uplink carrier when a total transmission power over the first and second uplink carriers reaches a predefined threshold value;
  wherein the executable instructions when executed cause the apparatus to reduce power for a channel by scaling down an enhanced dedicated physical data channel gain factor; and
  wherein the executable instructions when executed cause the apparatus to scale down the enhanced dedicated physical data channel gain factor by scaling down the enhanced dedicated physical data channel gain factor $\beta_{eci,k}$ to a value $\beta_{ed,k}$, reduced.

10. The apparatus of claim 9, wherein the executable instructions when executed cause the apparatus to prioritize the first and second uplink carriers by assigning a higher priority to the one of the first and second uplink carriers having a lower pilot channel transmission power level than the other uplink carrier.

11. The apparatus of claim 9, wherein the executable instructions when executed cause the apparatus to: determine a first and second pilot channel transmission power level by determining a first and second dedicated physical control channel power level; and prioritize the first and second uplink carriers by prioritizing the first and second uplink carriers based at least in part upon the first and second dedicated physical control channel power levels.

12. The apparatus of claim 9, wherein the executable instructions when executed further cause the apparatus to allocate data rates to the first and second uplink carriers, wherein preferential data rates are allocated to the one of the first and second uplink carriers having a higher priority than the other uplink carrier.

13. An apparatus comprising: means for determining a first pilot channel transmission power level for a first uplink carrier; means for determining a second pilot channel transmission power level for a second uplink carrier; means for prioritizing the first and second uplink carriers based at least in part upon the first and second pilot channel transmission power levels; and means for reducing power for a channel on the one of the first and second uplink carriers having a lower priority than the other uplink carrier when a total transmission power over the first and second uplink carriers reaches a predefined threshold value;
  wherein the means for reducing power for a channel further comprises means for scaling down an enhanced dedicated physical data channel gain factor; and
  wherein the means for scaling down the enhanced dedicated physical data channel gain factor further comprises means for scaling down the enhanced dedicated physical data channel gain factor $\beta_{ed,k}$ to a value $\beta_{eci,k}$, reduced.

* * * * *